W. GREEN.
Potato Digger and Separator.
No. 81,772. Patented Sept. 1, 1868.
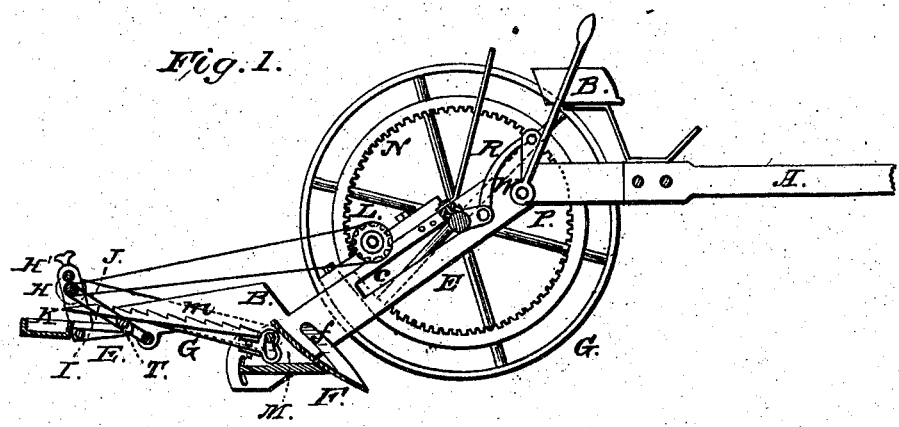
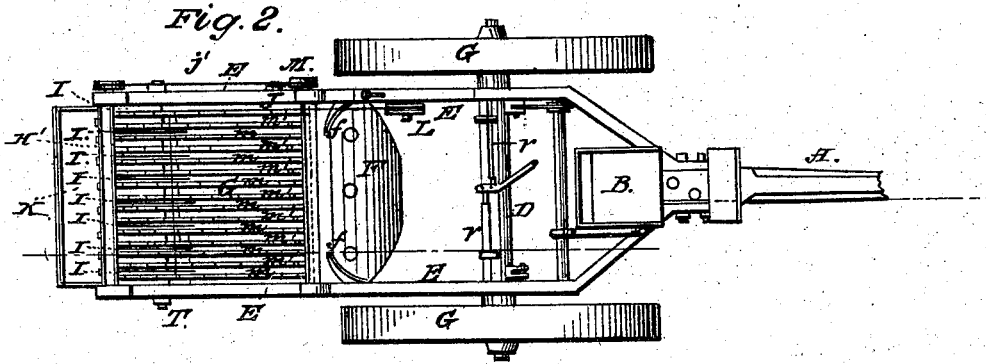

United States Patent Office.

WILLIAM GREEN, OF HOLLY, MICHIGAN.

Letters Patent No. 81,772, dated September 1, 1868; antedated August 28, 1868.

IMPROVEMENT IN POTATO-DIGGER AND SEPARATOR.

The Schedule referred to in these Letters Patent and making part of the same.

TO ALL WHOM IT MAY CONCERN:

Be it known that I, WILLIAM GREEN, of Holly, in the county of Oakland, and State of Michigan, have invented a new and improved Potato-Digger and Separator; and I do hereby declare that the following is a full, clear, and exact description of the construction and operation of the same, reference being had to the annexed drawings, making a part of this specification, in which—

Figure 1 is a longitudinal vertical section.

Figure 2 is a plan.

In this invention, a new and improved device is employed for separating the vines from the potatoes, whereby the work is more rapidly and effectually accomplished than in other machines; and, in connection with this, a new apparatus is used for adjusting the working parts of the machine, and throwing them into or out of gear.

In the drawings, A represents the draw-beam; B, the driver's seat; C C, the draught-wheels; D, the axle-tree, connecting the draught-wheels; E E', the frame, supported upon the axle-tree, and itself supporting the shovel F, the conveyer G, the separating-rollers H H', and cords I I, the belt J, that rotates the rollers H H', and the box K, that receives the potatoes after they are separated from the vines.

The form of the plow or shovel F is clearly shown in figs. 1 and 2, being a broad inclined straight-edged shovel-scraper, designed to run under the hills, plow up dirt, potatoes, and vines, and throw them all together over its rear or upper edge upon the conveyer G. It is provided at its upper corners with guides $f f$, formed by bending the corners over inward, in order to direct the vines, dirt, &c., to the centre of the conveyer, and to prevent them from falling back.

The conveyer G acts as an agitator and separator as well as a conveyer. It is formed by mounting a series of inclined parallel rods $m\ m'$ upon a shaft, having a series of cranks, arranged in such a manner that, as the cranks rotate, the alternate rods $m\ m$ or $m'\ m'$ will always move in the same direction, while the adjacent rods $m\ m'$ will always move in opposite directions.

The upper edges of these rods are serrated, as shown in fig. 1, in order to prevent the vines, &c., from slipping back. They are arranged longitudinally with the machine, the crank-shaft M coming immediately under the rear edge of the plow, and the other end of the rod coming directly over the forward edge of the box which is to receive the potatoes. They are situated so near together that neither the potatoes nor the vines can drop between them, while yet a space is left sufficient for the dirt to be sifted through.

The rear end of the rods is supported by and slides upon a cross-bar, T. As the vines and dirt are carried over these bars, the mass is so agitated and shaken by the revolution of the shafts M M' that the dirt is pretty effectually cleaned off, and the vines and potatoes arrive at the upper or rear end of the conveyer comparatively clean.

If any potatoes are, in passing along the conveyer, detached from the vines, they will be carried along between the cords I I, and under the rollers H H', and dropped into the box K clean.

The vines, whether having potatoes attached to them or not, will be intercepted by the cords I I, which run on rollers S H, and will be, by the said cords, raised up from the bars $m\ m'$, and carried between the rollers H H', in passing between which, the potatoes will be detached from them, and will drop upon the conveyer and be carried to box K, as above described, while the vines will pass between the rollers, and be thrown from their rear side upon the ground, or into a receptacle attached to the machine for that purpose.

The belt J, that rotates the rollers H H', receives its motion from a pulley, L, that is connected with a spur-wheel, which gears into a cog-wheel, N, attached to one of the draught-wheels, and having its teeth on the inside of its rim, as shown in the drawings. The bearings of the spur-wheel are fixed to the inclined part E of the frame, so that, in order to make it possible to put the spur-wheel into or out of gear with the wheel N at pleasure, I make the frame itself adjustable on the axle-tree which supports it. $e$ represents a slot in the sides of the frame, through which passes the axle-tree.

By lowering the frame E E' down, the wheel will be brought into gear at the moment that the plow is put into the ground, while by sliding the frame forward, which raises it on the axle, the wheels are thrown out of gear, and, at the same time, the plow is raised up from the ground. Any suitable device may be employed for thus adjusting the frame on the axle. At present, I use a lever, O, which turns a shaft, P, connected to the axle by a link, W.

R is a lever, which operates simultaneously two sliding rods $r\ r$, working upon the axle, and causing the ends of the rods to enter or recede from holes in the inner side of the frame E, whereby the frame can be fixed at any desired height upon the axle.

Having thus described my invention, what I claim as new, and desire to secure by Letters Patent, is—

1. Simultaneously adjusting the plow, and putting the apparatus into or out of gear with its driving-wheels, by means of the sliding frame E E' and axle D, when operating together for that purpose, substantially as described.

2. The conveyer G, in combination with the shovel F, substantially as and for the purpose set forth.

3. The use of the two rollers H H', for the purpose of detaching and separating the potatoes from the vines, substantially as described.

4. The combination of the conveyer G, cords I I, and rollers H H', substantially as and for the purpose set forth.

To the above specification of my invention, I have signed my hand, this 6th day of February, 1868.

WILLIAM GREEN.

Witnesses:
 CHAS. A. PETTIT.
 SOLON C. KEMON.